US008122985B2

(12) United States Patent
Nagashima et al.

(10) Patent No.: US 8,122,985 B2
(45) Date of Patent: Feb. 28, 2012

(54) DOUBLE-ENDED INVERTER DRIVE SYSTEM FOR A FUEL CELL VEHICLE AND RELATED OPERATING METHOD

(75) Inventors: James M. Nagashima, Cerritos, CA (US); Gregory S. Smith, Woodland Hills, CA (US); Brian A. Welchko, Torrance, CA (US); Sibaprasad Chakrabarti, Torrance, CA (US); Milun Perisic, Torrance, CA (US); George John, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 731 days.

(21) Appl. No.: 12/142,651

(22) Filed: Jun. 19, 2008

(65) Prior Publication Data
US 2009/0032319 A1     Feb. 5, 2009

Related U.S. Application Data

(60) Provisional application No. 60/952,745, filed on Jul. 30, 2007.

(51) Int. Cl.
    *B60W 20/00*    (2006.01)
    *B60W 10/24*    (2006.01)
    *B60W 10/26*    (2006.01)
    *B60W 10/28*    (2006.01)

(52) U.S. Cl. ........... 180/65.275; 180/65.285; 180/65.29; 180/65.31; 180/65.8

(58) Field of Classification Search .................. 180/65.1, 180/65.275, 65.285, 65.29, 65.31, 65.8; 701/123
See application file for complete search history.

(56) References Cited

U.S. PATENT DOCUMENTS

| 5,389,749 | A  | * | 2/1995  | Hokari et al. ............... 187/293 |
| 5,657,217 | A  | * | 8/1997  | Watanabe et al. ............ 363/71 |
| 6,214,484 | B1 |   | 4/2001  | Hauer |
| 6,242,884 | B1 | * | 6/2001  | Lipo et al. .................. 318/808 |
| 6,321,145 | B1 | * | 11/2001 | Rajashekara ................ 701/22 |
| 6,555,928 | B1 | * | 4/2003  | Mizuno et al. ............. 290/40 C |
| 6,676,400 | B2 | * | 1/2004  | Ito ............................. 425/145 |
| 7,028,792 | B2 | * | 4/2006  | Ishikawa et al. ........... 180/65.1 |

(Continued)

OTHER PUBLICATIONS

Singh, G.K., "Multi-Phase Induction Machine Drive Research—a Survey," Elsevier Science B.V., Electric Power Systems Research, 2002, pp. 139-147.

(Continued)

*Primary Examiner* — J. Allen Shriver
*Assistant Examiner* — John R Olszewski
(74) *Attorney, Agent, or Firm* — Ingrassia Fisher & Lorenz, P.C.

(57) ABSTRACT

Systems and methods are provided for a double-ended inverter drive system for a fuel cell vehicle. An electric drive system for a vehicle comprises an electric motor configured to provide traction power to the vehicle. A first inverter is coupled to the electric motor, and is configured to provide alternating current to the electric motor. A fuel cell is coupled to the first inverter to provide power flow from the fuel cell to the electric motor. A second inverter is coupled to the electric motor, and is configured to provide alternating current to the electric motor. An energy source is coupled to the second inverter to provide power flow between the energy source and the electric motor. A controller is coupled to the first inverter and the second inverter, and is configured to provide a constant power from the fuel cell during operation of the electric motor.

6 Claims, 4 Drawing Sheets

U.S. PATENT DOCUMENTS

| | | | |
|---|---|---|---|
| 7,104,347 B2 * | 9/2006 | Severinsky et al. ......... 180/65.23 |
| 7,130,205 B2 * | 10/2006 | Peng ............................. 363/140 |
| 7,154,237 B2 | 12/2006 | Welchko et al. |
| 7,199,535 B2 | 4/2007 | Welchko et al. |
| 7,270,202 B2 * | 9/2007 | Kondo ......................... 180/65.1 |
| 2003/0002309 A1 * | 1/2003 | Furukawa et al. ............ 363/132 |
| 2004/0262057 A1 * | 12/2004 | Kumar ......................... 180/65.2 |
| 2006/0164027 A1 * | 7/2006 | Welchko et al. ............... 318/105 |
| 2006/0164028 A1 * | 7/2006 | Welchko et al. ............... 318/105 |
| 2007/0256872 A1 * | 11/2007 | Yamamuro et al. ........... 180/65.5 |

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Chinese Office Action, dated Sep. 7, 2011, for Chinese Patent Application No. 200810173769.8.

* cited by examiner

DOUBLE-ENDED INVERTER DRIVE SYSTEM FOR A FUEL CELL VEHICLE AND RELATED OPERATING METHOD

CROSS-REFERENCE TO RELATED APPLICATION(S)

This application claims the benefit of U.S. provisional patent application Ser. No. 60/952,745, filed Jul. 30, 2007.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Furthermore, most fuel cell vehicles and/or systems are designed to provide all of the traction power for vehicle operation from the fuel cell. This results in overdesign of the fuel cell stack because it must provide the peak power needed for the vehicle.

BRIEF SUMMARY

An apparatus is provided for an electric drive system for a vehicle. The electric drive system comprises an electric motor configured to provide traction power to the vehicle. A first inverter is coupled to the electric motor, and is configured to provide alternating current to the electric motor. A fuel cell is coupled to the first inverter, wherein the first inverter is configured to provide power flow from the fuel cell to the electric motor. A second inverter is coupled to the electric motor, and is configured to provide alternating current to the electric motor. An energy source is coupled to the second inverter, wherein the second inverter is configured to provide power flow between the energy source and the electric motor. A controller is coupled to the first inverter and the second inverter, and is configured to provide a constant power from the fuel cell during operation of the electric motor.

An apparatus is provided for an automotive drive system. The automotive drive system comprises an AC motor having an average required power during operation. A first inverter is coupled to the AC motor, and is configured to provide alternating current to the AC motor. A fuel cell is coupled to the first inverter, wherein the first inverter is configured to provide power flow from the fuel cell to the AC motor. A second inverter is coupled to the AC motor, and is configured to provide alternating current to the AC motor. An energy source is coupled to the second inverter, wherein the second inverter is configured to provide power flow between the energy source and the AC motor. A controller is coupled to the first inverter and the second inverter, and is configured to provide the average required power from the fuel cell to the AC motor.

A method is provided for controlling an electric motor using a double-ended inverter system coupled to a fuel cell and an energy source. The method comprises providing a constant power to the electric motor from the fuel cell, wherein the fuel cell is configured such that the constant power corresponds to a fuel cell operating point having a peak efficiency. If the required power of the electric motor is greater than the constant power, the method further comprises providing power to the electric motor from the energy source. If the required power is less than the constant power, the method comprises charging the energy source using the fuel cell.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. Furthermore, the terms "first", "second" and other such numerical terms referring to structures do not imply a sequence or order unless clearly indicated by the context.

For the sake of brevity, conventional techniques related to signaling, sensors, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate to optimizing the use of a fuel cell in a vehicle. The fuel cell may be selected to provide a constant power at a voltage level, where the fuel cell operates at or near a peak efficiency for the given voltage level. This avoids overdesign of the fuel cell and may improve efficiency and/or life of the fuel cell. A second energy source, such as a battery, may be used to provide any additional peak power the vehicle may require.

Figure 1:
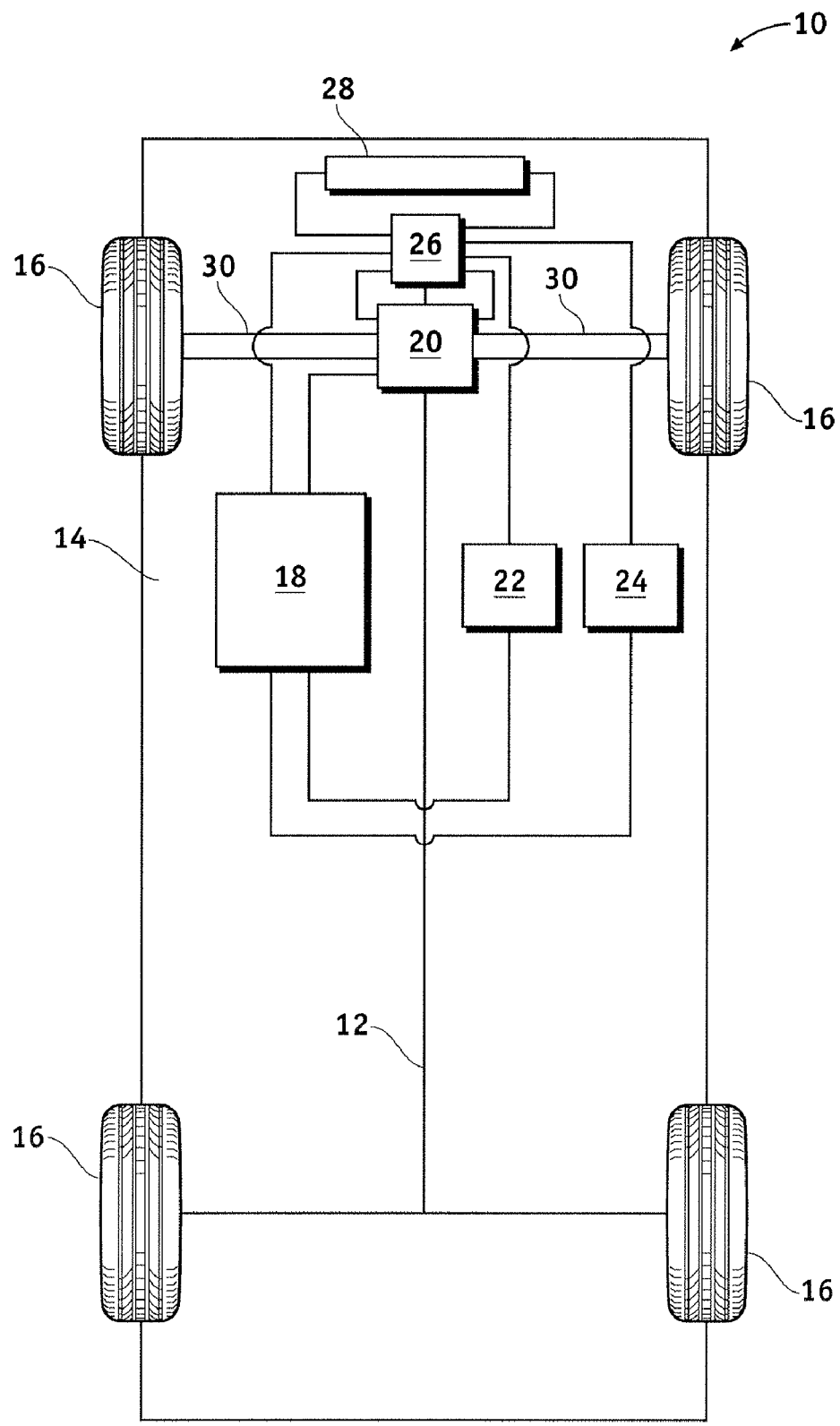
FIG. 1 is a block diagram of an exemplary automobile in accordance with one embodiment.

Referring now to FIG. 1, a vehicle, or automobile 10, in accordance with one embodiment includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 further includes a motor 20, a fuel cell module 22, an energy source 24, a power inverter assembly 26, and a radiator 28. As shown, the fuel cell module 22 and the energy source 24 are in operable communication and/or electrically connected to the electronic control system 18 and the power inverter assembly 26. During operation, the automobile 10 is operated by providing power to the wheels 16 with the motor 20 which receives power from the fuel cell module 22 and the energy source 24.

In an exemplary embodiment, the motor 20 is a multi-phase alternating current (AC) motor and includes a set of windings (or coils), wherein each winding corresponds to one phase of the motor 20. Although not illustrated, the motor 20 includes a stator assembly (including the coils), a rotor assembly (including a ferromagnetic core), and a cooling fluid (i.e., coolant), as will be appreciated by one skilled in the art. The motor 20 may be an induction motor, a permanent magnet motor, or any type suitable for the desired application. As shown in FIG. 1, the motor 20 may also include a transmission integrated therein such that the motor 20 and the transmission are mechanically coupled to at least some of the wheels 16 through one or more drive shafts 30.

In an exemplary embodiment, the radiator 28 is connected to the frame at an outer portion thereof and although not illustrated in detail, includes multiple cooling channels that contain a cooling fluid (i.e., coolant), such as water and/or ethylene glycol (i.e., "antifreeze"), and is coupled to the power inverter assembly 26 and the motor 20. In one embodiment, the power inverter assembly 26 receives and shares coolant with the motor 20. In alternative embodiments, the power inverter assembly 26 and/or motor 20 are air-cooled.

In an exemplary embodiment, the electronic control system 18 is in operable communication with the motor 20, the fuel cell module 22, the energy source 24, and the power inverter assembly 26. Although not shown in detail, the electronic control system 18 may include various sensors and automotive control modules, or electronic control units (ECUs), such as an inverter control module, and a vehicle controller, and at least one processor and/or a memory which includes instructions stored thereon (or in another computer-readable medium) for carrying out the processes and methods as described below.

Although not illustrated, the fuel cell module 22, in one embodiment, includes among other components, a fuel cell having an anode, a cathode, an electrolyte, and a catalyst. As is commonly understood, the anode, or negative electrode, conducts electrons that are freed from, for example, hydrogen molecules so that they can be used in an external circuit. The cathode, or positive electrode, conducts the electrons back from the external circuit to the catalyst, where they can recombine with the hydrogen ions and oxygen to form water. The electrolyte, or proton exchange membrane, conducts only positively charged ions while blocking electrons, while the catalyst facilitates the reaction of oxygen and hydrogen. Depending on the embodiment, various combinations electrolytes, fuels, and oxidants may be used, and it will be appreciated in the art that the subject matter discussed herein applies to any type of fuel cell module 22.

In an exemplary embodiment, the fuel cell module 22 may comprise a fuel cell stack or a module formed by combining individual fuel cells in series (e.g., to achieve a higher voltage level) and/or parallel (e.g., to achieve a higher current). In an exemplary embodiment, the fuel cell module 22 has a peak efficiency or optimum operating point (or range) for the current (e.g., power) provided by the fuel cell module 22 based on the voltage level of the individual fuel cell(s) comprising the fuel cell module 22, as described below. A peak efficiency or optimum operating point corresponds to power output (current output for the given voltage level) where the ratio of electrical energy output to the input energy is at a maximum for the voltage level, as will be appreciated in the art.

Figure 2:
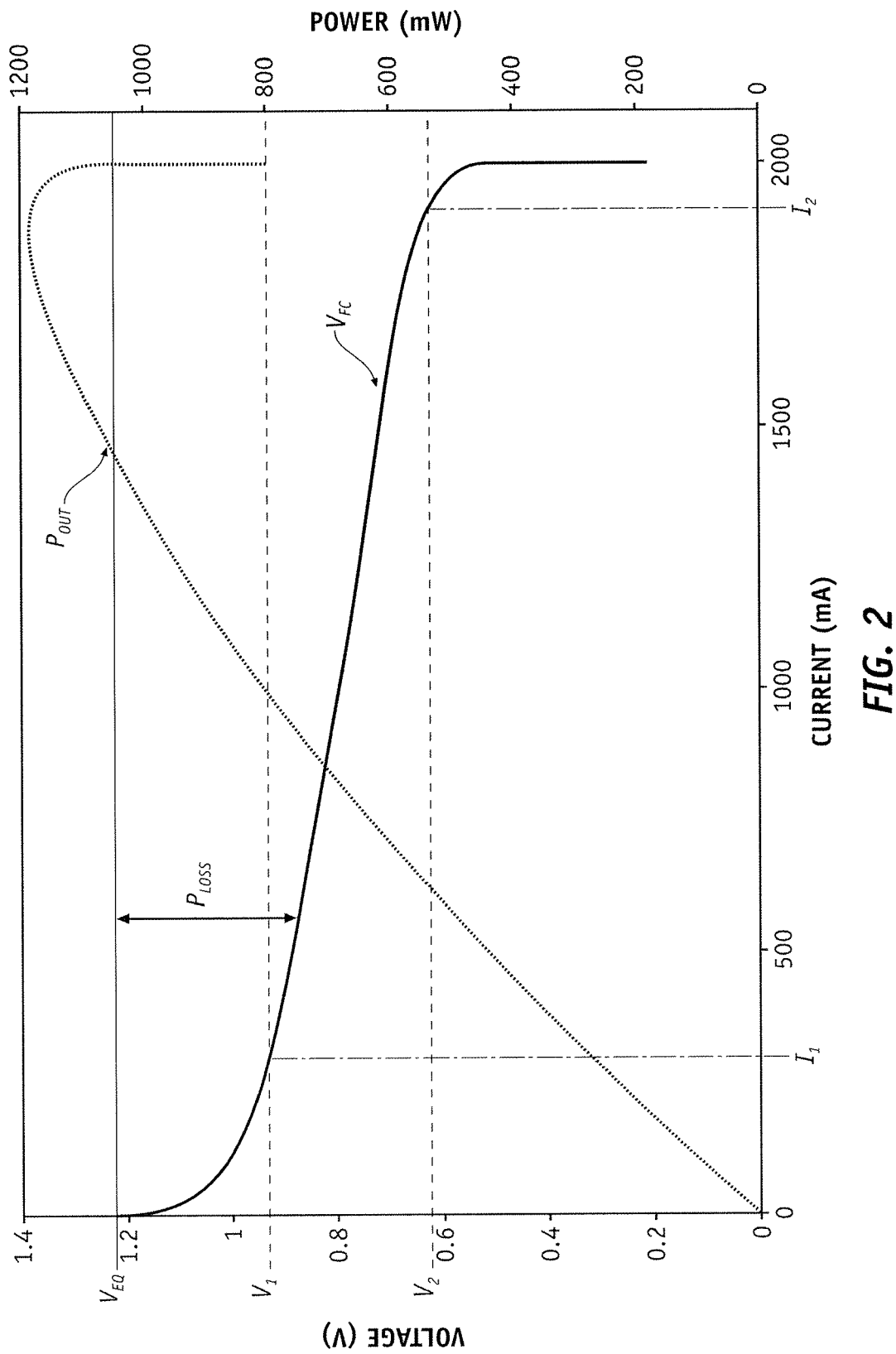
FIG. 2 is a polarization curve for an exemplary fuel cell suitable for use in the automobile of FIG. 1, showing the fuel cell voltage level and power output as a function of current in accordance with one embodiment.

Referring now to FIG. 2, in an exemplary embodiment, the fuel cell module 22 comprises a stack of individual fuel cells, wherein each individual fuel cell may be characterized by an operating polarization curve similar to the one shown in FIG. 2. As shown, the voltage of the fuel cell $V_{FC}$ varies with respect to the current being provided by the fuel cell, which results in a power output, $P_{OUT}$. During operation, the fuel cell potential ($V_{FC}$) is decreased from its maximum theoretical or equilibrium potential ($V_{EQ}$) because of irreversible losses ($P_{LOSS}$). In an exemplary embodiment, the loss ($P_{LOSS}$) is non-linear at currents below a first current ($I_1$) and currents above a second current ($I_2$). At currents below $I_1$, the fuel cell experiences activation polarization losses, and at currents above $I_2$ the fuel cell experiences concentration polarization losses, as will be appreciated in the art. However, as shown, the loss $P_{LOSS}$ is relatively linear (e.g., ohmic losses) over the current range bounded by $I_1$ and $I_2$. In an exemplary embodiment, the fuel cell efficiency (e.g., ratio of $P_{OUT}$ to $P_{LOSS}$) is greatest over the relatively linear region between $I_1$ and $I_2$. In an exemplary embodiment, the fuel cell module 22 is designed such that the fuel cell(s) comprising the fuel cell module 22 operates between $I_1$ and $I_2$. In accordance with one embodiment, the fuel cell stack may be designed such that during operation each fuel cell voltage level corresponds to the linear region (e.g., $V_2 \leq V_{FC} \leq V_1$) as described below.

Referring again to FIG. 1, depending on the embodiment, the energy source 24 may comprise a battery, another fuel cell, an ultracapacitor, or another suitable voltage source. The battery may be any type of battery suitable for use in a desired application, such as a lead acid battery, a lithium-ion battery, a nickel-metal battery, or another rechargeable battery. In an exemplary embodiment, the power inverter assembly 26 is configured to provide power to/from the motor 20, the fuel cell module 22, and the energy source 24, as discussed in greater detail below.

Figure 3:
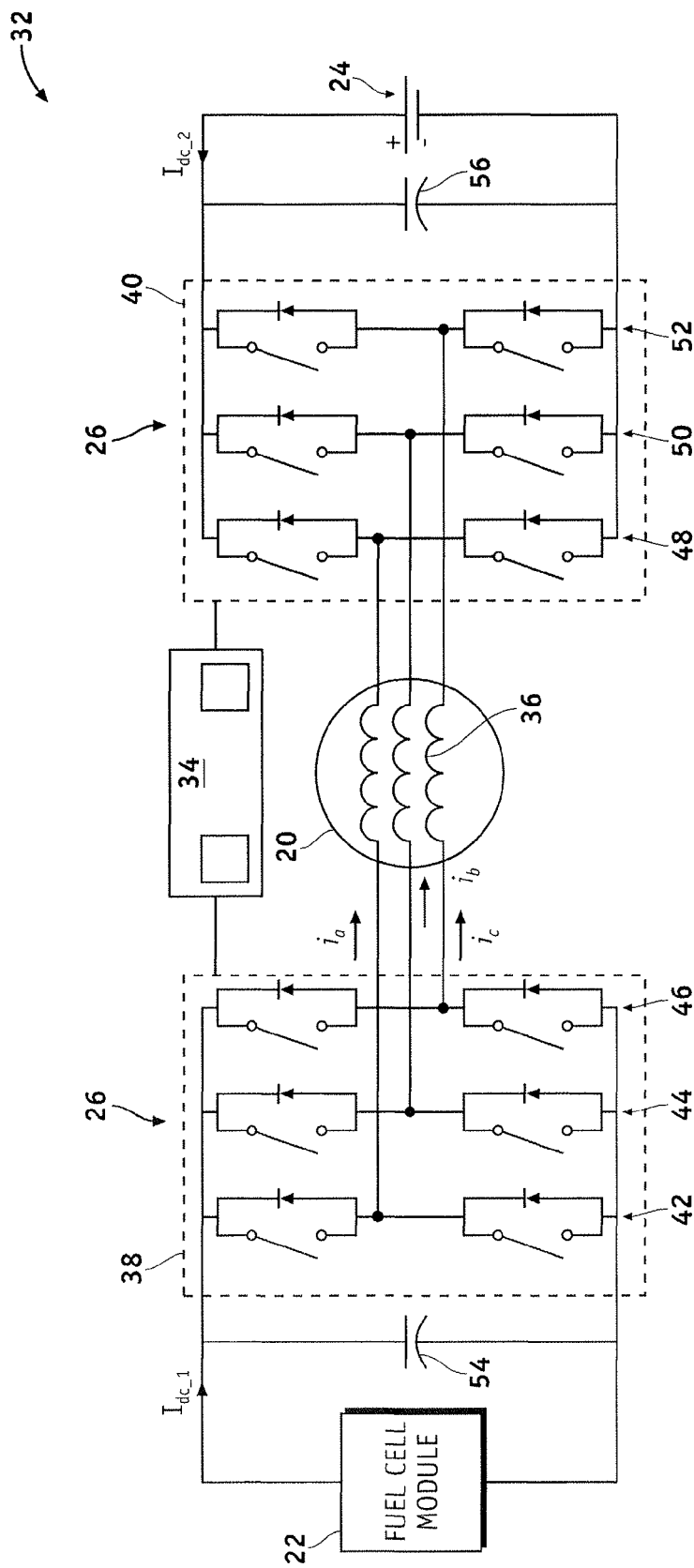
FIG. 3 is a schematic view of an embodiment of a double-ended inverter system suitable for use in the automobile of FIG. 1.

Referring now to FIG. 3, a double-ended inverter system 32 may be adapted to drive the motor 20 in accordance with one embodiment. The double-ended inverter system 32 includes the motor 20, the fuel cell module 22, the energy source 24, the power inverter assembly 26, and a controller 34. In order to power the motor 20, DC power is provided from the fuel cell module 22 and the energy source 24 to the power inverter assembly 26, which converts the DC power into AC power provided to the motor windings 36 based on the speed, commanded torque (i.e., commanded synchronous frame currents), and other motor parameters, as is commonly understood in the art.

Referring again to FIG. 2, the inverter assembly 26 includes a first inverter 38 and a second inverter 40, each including six switches (e.g., semiconductor devices, such as transistors and/or switches) with antiparallel diodes (i.e., antiparallel to each switch). As shown, the switches in the sections 38 and 40 are arranged into three pairs (or legs), with pairs 42, 44, and 46 being in the first inverter 38 and pairs 48, 50, and 52 being in the second inverter 40. In an exemplary embodiment, the windings 36 of the motor 20 are electrically coupled, at opposing ends thereof, between the switches of switch pairs 42, 44, 46 in the first inverter 38 and the switch pairs 48, 50, 52 in the second inverter 40 as shown. The double-ended inverter system 32 may also include first and second capacitors 54 and 56, respectively connected in parallel with the fuel cell module 22 and the energy source 24, to smooth current ripple during operation.

Still referring to FIG. 3, the controller 34 is in operable communication and/or electrically connected to the first and second inverters 38 and 40. The controller 34 is responsive to commands received from the driver of the automobile 10 (e.g., via an accelerator pedal or the electronic control system 18). In an exemplary embodiment, the controller 34 is configured to modulate and control the inverters 38, 40 using high frequency pulse width modulation (PWM), as will be understood. The controller 34 provides a control algorithm that achieves desired power flow between the fuel cell module 22 and the energy source 24 while producing the commanded torque inside the motor 20. Many combinations of voltage across the windings 36 may produce the commanded torque in the motor 20 and achieve desired power flow between the fuel cell module 22, the energy source 24, and the motor 20. The controller 34 provides PWM signals to operate (i.e., modulate) the switches within the first and second inverters 38 and 40 to cause the desired output voltages to be applied across the windings 36 to operate the motor 20 with the required torque, as will be appreciated in the art.

Referring again to FIGS. 2 and 3, in an exemplary embodiment, the double-ended inverter system 32 is configured and/or designed to maximize the efficiency (i.e., the ratio of electrical energy output to the input energy) of the fuel cell module 22 and minimize the stress on the fuel cell module 22 imposed by the system. As described above, the efficiency of the fuel cell module 22 depends on the amount of power and/or current provided by (or drawn from) it. In an exemplary embodiment, the fuel cell module 22 (e.g., the fuel cell stack) may be designed for a voltage level and current output that corresponds to an optimum efficiency for the fuel cell module 22. In accordance with one embodiment, the motor 20 (or vehicle) has an average required power (based on the torque commands) during operation. The fuel cell module 22 may be designed such that when the fuel cell module 22 is producing the average required power (or current), the operating point is within the optimum efficiency range and the fuel cell(s) comprising the fuel cell module 22 have a voltage ($V_{FC}$) between $V_1$ and $V_2$ during operation. In accordance with one embodiment, the double-ended inverter system 32 is configured to operate the fuel cell module 22 at a peak efficiency or optimum operating point by providing continuous and/or constant power (e.g., current) to the motor 20 from the fuel cell module 22 during operation of the motor 20 that corresponds to a peak efficiency for the fuel cell(s).

In an exemplary embodiment, the energy source 24 is designed to provide any peak power required by the motor 20 (e.g., power that exceeds the power provided by the fuel cell module 22) and operate efficiently in conjunction with the fuel cell module 22. For example, if the motor 20 (or vehicle) has a maximum required power during operation, the energy source 24 should be capable of providing the difference between the maximum required power and the power provided by the fuel cell module 22 to the motor 20. The energy source 24 may be selected or designed such that the efficiency of the energy source 24 is maximized or optimized for providing power values ranging from zero to the peak power required by the motor 20. For example, in the case where the energy source 24 is a battery, the voltage level or the chemical composition and/or type of the battery may be selected for most efficient operation.

Figure 4:
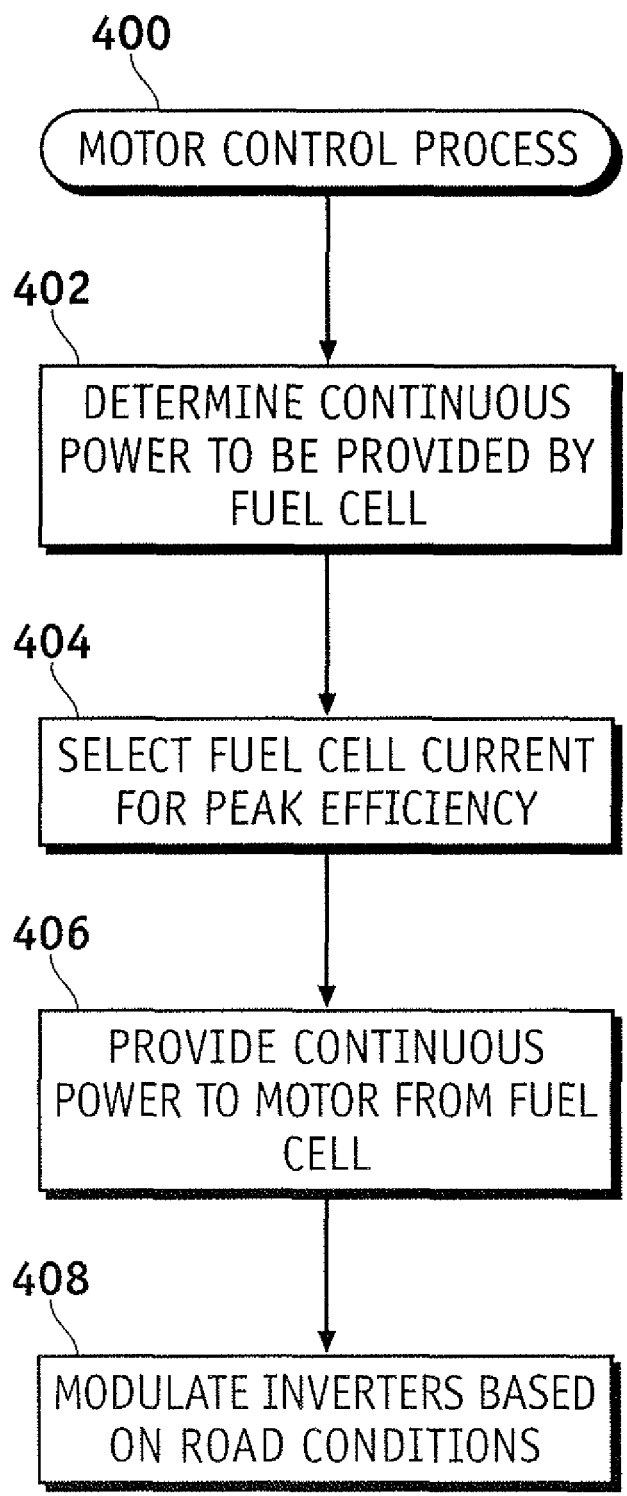
FIG. 4 is a flow diagram of a motor control process in accordance with one embodiment.

Referring now to FIG. 4, in an exemplary embodiment, a double-ended inverter system 32 may be configured to perform a motor control process 400 and additional tasks, functions, and operations described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as the controller 34 or the electronic control system 18. It should be appreciated any number of additional or alternative tasks may be included, and may be incorporated into a more comprehensive procedure or process having additional functionality not described in detail herein.

Referring again to FIG. 4, and with continued reference to FIGS. 1-3, the motor control process 400 may be initiated in response to a signal or command from a vehicle control module (e.g., an electronic control unit or ECU) or upon startup of a vehicle. In an exemplary embodiment, the motor control process 400 may determine a continuous and/or constant power (or current) to be provided by the fuel cell module (task 402). In accordance with one embodiment, the continuous and/or constant power is the average power required by the motor and/or vehicle. Based on the power to be provided, the desired current and corresponding voltage level for the fuel cell module is selected that corresponds to a peak efficiency point when providing the continuous and/or constant power (i.e., current) (task 404). It should be understood that the peak efficiency point (or optimum operating range) for a fuel cell module may vary based upon the chemical composition (e.g., fuel cell type or type of electrolytes), efficiency characteristics of the fuel cell(s), and the number of fuel cells in the fuel cell stack. The motor control process 400 is configured to provide the continuous power from the fuel cell module to the motor (task 406). For example, the controller may modulate the inverters to cause the constant power to flow from the fuel cell module to the motor.

In an exemplary embodiment, the motor control process 400 is configured to modulate the inverters to provide power to/from the motor and another energy source based upon the real-time road conditions (task 408). For example, in a situation where the motor and/or vehicle requires more power than the fuel cell module is configured to provide (i.e., the continuous and/or constant power), the inverters may be modulated to provide additional or peak power from the energy source. Alternatively, if the motor and/or vehicle requires less power than the fuel cell module is providing, the inverters may be modulated to charge the energy source using the excess power provided by the fuel cell module. In an exemplary embodiment, the inverters are modulated such that the inverter 38 coupled to the fuel cell module 22 operates at a unity power factor with respect to the current in the motor 20. When the inverter 38 is operating at unity power factor, the inverter 38 is able to supply the motor 20 with the highest possible output voltage when the fuel cell module 22 is providing all of the power being consumed by the motor 20 (e.g., the motor requires power less than or equal to the average power). The second inverter 40 may provide any reactive power consumed by the motor 20. This type of operation represents a maximum sustainable continuous load condition and minimizes the required current rating of the double-ended inverter system 32. This improves overall system efficiency, since resistive losses increase proportionally with an increasing current. It should be appreciated that the first inverter 32 is not required to operate at unity power factor under all conditions, however, doing so allows for a higher system voltage when the fuel cell module is providing power.

The systems and/or methods described above provide a way to improve the operating efficiency of fuel cell vehicles by operating the fuel cell at a peak efficiency point, and using the double-ended inverter system to provide additional power from another energy source as needed by road conditions. The fuel cell stack may be designed and/or sized to provide a constant and/or continuous power at a peak efficiency point. Similarly, the other energy source may also be selected or designed for improved efficiency.

Other features of a double-ended inverter system, such as various power flows or power transfer, may also be achieved. The fuel cell and the energy source can share the peak motor load without additional power electronics. As described above, the performance of the motor is not impaired and the commanded torque may still be generated within the motor, while allowing excess power to charge the energy source.

Other embodiments may utilize system and method described above in different types of automobiles, different vehicles (e.g., watercraft and aircraft), or in different electrical systems altogether, as it may be implemented in any situation where fuel cells are used as part of an electric drive system. Further, the motor and the inverters may have different numbers of phases, and the systems described herein should not be construed as limited to a three-phase design. The basic principles discussed herein may be extended to higher-order phase systems as will be understood in the art. Other forms of energy sources may be used, such as current sources and loads including diode rectifiers, thyristor converters, fuel cells, inductors, capacitors, and/or any combination thereof.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An electric drive system for an automotive vehicle comprising:
    an electric motor configured to provide traction power to the automotive vehicle;
    a first inverter coupled to the electric motor, the first inverter being configured to provide alternating current to the electric motor;
    a fuel cell coupled to the first inverter, wherein the first inverter is configured to provide power flow from the fuel cell to the electric motor;
    a second inverter coupled to the electric motor, the second inverter being configured to provide alternating current to the electric motor;
    an energy source coupled to the second inverter, wherein the second inverter is configured to provide power flow between the energy source and the electric motor; and
    a controller coupled to the first inverter and the second inverter, wherein the controller is configured to:
        modulate the first inverter to provide a constant power to the electric motor from the fuel cell, wherein the constant power is substantially equal to an average required power during operation of the electric motor and corresponds to an operating point having a peak efficiency for the fuel cell;
        modulate the second inverter to provide power to the electric motor from the energy source when a required power of the electric motor during operation of the electric motor is greater than the constant power; and
        modulate the second inverter to charge the energy source from the fuel cell when the required power is less than the constant power.

2. The electric drive system of claim 1, the vehicle having a peak power equal to a difference between a maximum required power and the constant power, wherein the energy source is configured such that the energy source operates efficiently when providing power less than or equal to the peak power.

3. The electric drive system of claim 2, wherein the energy source is a battery.

4. The electric drive system of claim 1, wherein the controller is configured to modulate the first inverter and the second inverter such that the first inverter operates at unity power factor.

5. The electric drive system of claim 1, wherein the electric motor includes a set of windings coupled between the first inverter and the second inverter.

6. An electric drive system for an automotive vehicle comprising:
   an electric motor configured to provide traction power to the automotive vehicle, the electric motor including a set of windings;
   a first inverter coupled to a first end of the set of windings of the electric motor, the first inverter being configured to provide alternating current to the electric motor;
   a fuel cell module coupled to the first inverter, wherein the first inverter is configured to provide power flow from the fuel cell module to the electric motor;
   a second inverter coupled to a second end of the set of windings of the electric motor, the second inverter being configured to provide alternating current to the electric motor;
   a battery coupled to the second inverter, wherein the second inverter is configured to provide power flow between the battery and the electric motor; and
   a controller coupled to the first inverter and the second inverter, wherein the controller is configured to:
      determine an average required power during operation of the electric motor;
      select a fuel cell current corresponding to a peak efficiency point for the fuel cell module based on the average required power;
      modulate the first inverter to provide the fuel cell current to the electric motor from the fuel cell module, resulting in a constant power substantially equal to the average required power being provided to the electric motor from the fuel cell module;
      modulate the second inverter to provide power to the electric motor from the battery when a required power of the electric motor during operation of the electric motor is greater than the constant power; and
      modulate the second inverter to charge the battery from the fuel cell module when the required power is less than the constant power.

* * * * *